Figure 1:
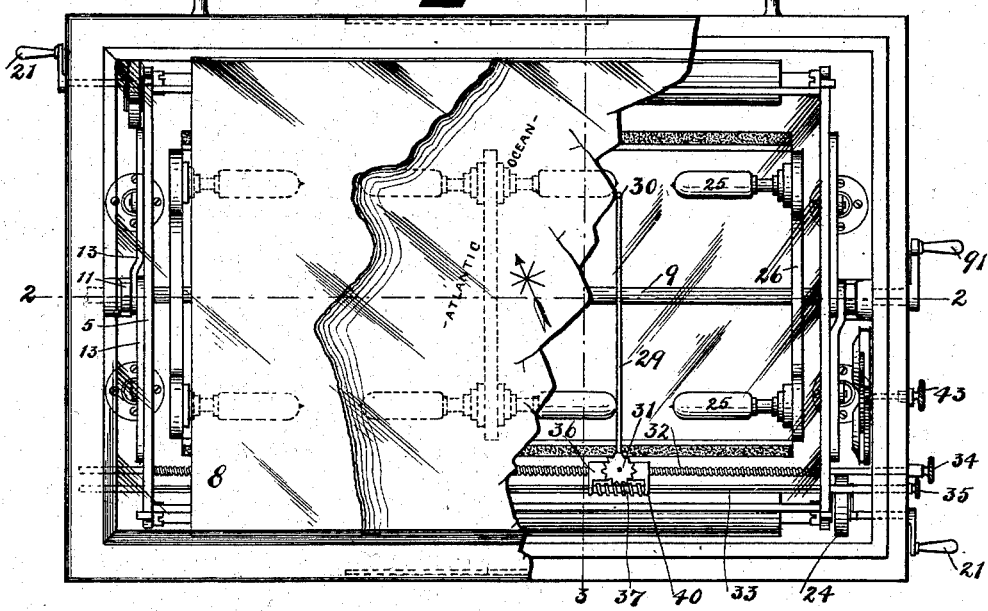

No. 729,847. PATENTED JUNE 2, 1903.
J. C. COLLAMORE & G. W. KERST.
CHART TABLE.
APPLICATION FILED JAN. 13, 1903.
NO MODEL. 2 SHEETS—SHEET 1.

WITNESSES:
Geo. V. Rasmussen
Robt. S. Allyn

INVENTORS
James C. Collamore
Grant W. Kerst
BY
R. C. Mitchell
ATTORNEY

No. 729,847. PATENTED JUNE 2, 1903.
J. C. COLLAMORE & G. W. KERST.
CHART TABLE.
APPLICATION FILED JAN. 13, 1903.
NO MODEL. 2 SHEETS—SHEET 2.

WITNESSES:
Geo. V. Rasmussen
Rob S. Allyn

INVENTORS
James C. Collamore
Grant W. Kerst
BY
R. Cunichee,
ATTORNEY

No. 729,847. Patented June 2, 1903.

UNITED STATES PATENT OFFICE.

JAMES C. COLLAMORE AND GRANT W. KERST, OF BROOKLYN, NEW YORK; SAID KERST ASSIGNOR TO SAID COLLAMORE.

CHART-TABLE.

SPECIFICATION forming part of Letters Patent No. 729,847, dated June 2, 1903.

Application filed January 13, 1903. Serial No. 138,809. (No model.)

*To all whom it may concern:*

Be it known that we, JAMES C. COLLAMORE and GRANT W. KERST, citizens of the United States, residing at Brooklyn, Kings county, New York, have invented certain new and useful Improvements in Chart-Tables, of which the following is a full, clear, and exact description.

Our invention relates to the construction of an improved chart-table for use on board ship either by day or night.

It particularly relates to improved means for indicating positions on the chart and for recording or registering the time at which such indications have been taken.

It also relates to an improved means for effecting and perfecting the adjustment of the parts which more immediately carry the chart.

The object of our invention is to provide a construction which may be conveniently used for mounting a navigator's chart so that it may be adjusted readily and may be read either by daylight or in the dark by artificial light. A simple provision is made for indicating the position of the vessel upon the chart and for recording the time at which the reading is taken.

The invention consists in improvements, as hereinafter described, and shown in the accompanying drawings. The chart is mounted in an inclosed box between a glass support and a glass top plate, which are pressed together by an improved means for holding the chart out smooth, so that it may be accurately read. Beneath the plates and the chart are provided artificial lights for making the readings upon the chart visible from above. In order that the positions at which readings have been taken may be indicated upon the chart, we have provided an indicator, which is also mounted beneath the plates and the chart in such a manner that the light passing up from below will cast the shadow of the indicator upon the chart. At one side of the chart and also within the casing we provide a set of time-indicating wheels, which may be adjusted from outside of the box. The means for moving the indicating mechanism is also accessible from outside of the box. Such a box, with the parts provided therewith, constitutes a chart-table which is particularly adapted to be used on board ship on the bridge, which is usually unprotected from the weather. By the use of the construction a navigator may conveniently take such readings upon the chart as may be necessary without being obliged to go below.

Figure 2:
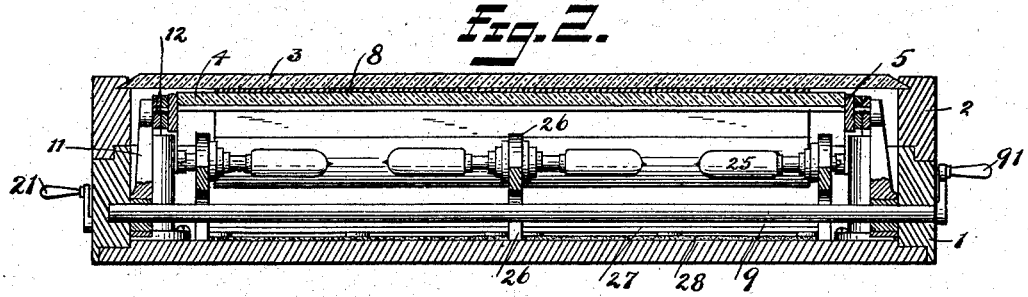
Figure 3:
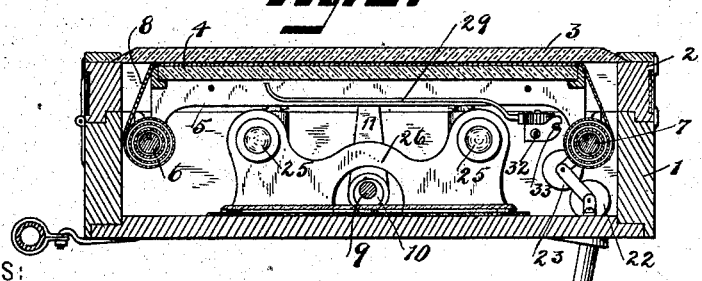
Figure 4:
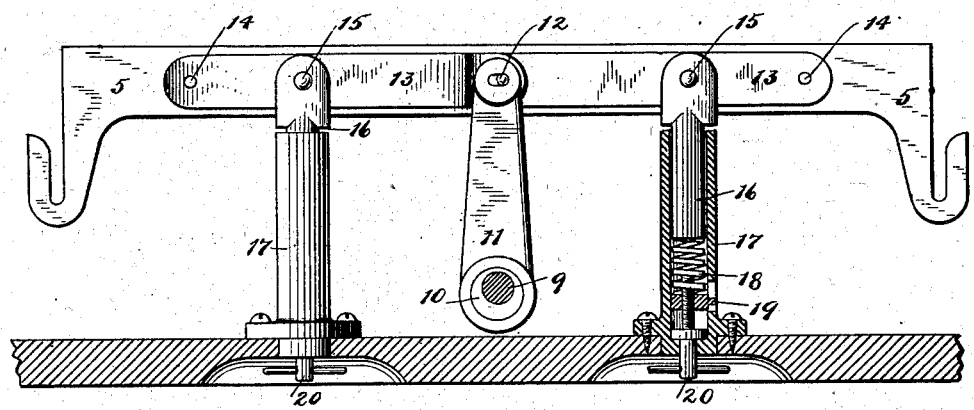
Figure 5:
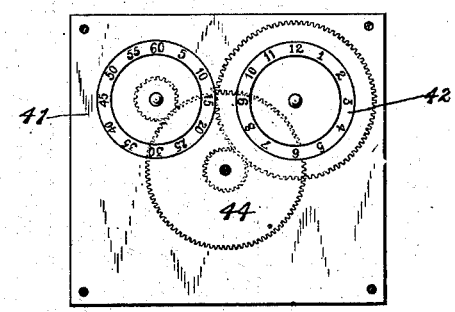

In the accompanying two sheets of drawings, Figure 1 is a plan view of a chart-table embodying the improvements of our invention, a part of the cover and chart being broken away in order that the interior may be more clearly seen. Fig. 2 is a longitudinal cross-section of the table shown in Fig. 1, taken on the line 2 2. Fig. 3 is a cross-section and elevation of the table, taken on the line 3 3 of Fig. 1. Fig. 4 is a relatively enlarged view of mechanism by means of which the lower plate of the chart-table is pressed toward the under side of the top plate, part of the same being broken away. Fig. 5 is an end elevation of the time-indicating wheels.

The box of the table consists of the bottom portion 1, to which is hinged the top portion 2, having a top plate of glass 3. Beneath the top plate 3 is mounted the glass supporting-plate 4, which is carried by the frame 5. The two ends of the side portions of the frame 5 are formed into hook-like portions, which support the rollers 6 and 7, upon which the chart 8 may be wound. This chart passes over the upper surface of the supporting-plate 4, and means is provided for forcing the plate upward, so that the chart may be pressed out smoothly against the under side of the top plate 4. This means is more particularly shown in Fig. 4.

9 is an operating-shaft which passes through the ends of the bottom portion of the box. At each end of this shaft is mounted a cam 10, by means of which the required pressure is effected. 11 is an eccentric-strap which surrounds the cam 10 and stands in a substantially vertical position. At the upper end this strap is provided with a pin 12, which fits into a short slot in the lever 13. This lever 13 is pivoted at 14 to the frame 5, which carries the supporting-plate 4. Intermediate of the pins 12 and 14 the fulcrum 15 of the lever is carried by a rod 16. This rod 16 is mounted in a sleeve 17, which is secured to the bottom of the box. A similar set of levers is provided at the right and left of the operating-shaft 9, so that both sides of the supporting-plate may be forced upwardly. On inspection of Fig. 4 it will be seen that by turning the shaft 9 the eccentric-strap 11 may be raised and lowered, so as to correspondingly lower and raise the carrying-frame 5. In order that the pressure which is applied by means of the frame 5 may be uniform throughout the entire surface of the plates, we have mounted rods 16 16 upon helical springs 18 18. This spring 18 rests upon a block 19, which may slide in the sleeve, but not rotate. The position of the block 19 may be adjusted by means of the screw 20, which projects into the recess in the bottom of the box. By this means all four corners of the supports for the frame 5 may be adjusted very readily.

When it is necessary to place a chart within the table, a cover 2 must of course be raised. The chart may then be freely placed in position over the supporting-plate 4, having been already wound upon one of the rollers 6 or 7, if desired. The cover of the box is then closed, and the lower plate 5 may be forced upward by rotating the shaft by means of the handle 91. Since all four corners of the supporting-frame 5 are yieldingly mounted, the plate may be uniformly pressed against the chart and the under surface of the top plate 3. When it is desired to adjust the position of the chart 8 upon the supporting-plate 4 while the cover of the box is closed, it is necessary to first release the pressure which has been applied by means of the plate 4. This may obviously be done by rotating the shaft 9 so as to raise the pin 12, carried by the eccentric-strap 11. The chart may be then drawn along, crossing the top of the supporting-plate 4, by winding it upon one or the other of the rollers 6 and 7. The handle 21, which is shown particularly in Fig. 1, is attached to the shaft of the small gear 22 and controls the rotation of the roller 7. For this purpose an idler 23 gears with the gear 22 and a gear 24, carried by the roller-shaft. It will thus be seen allowance is made for rotating the roller 7 by the handle 21, even though the roller 7 is in a raised or lowered position by reason of the corresponding position of the operating-shaft 9. A similar set of gears and handle may be provided for the roller 6.

Inside of the box and beneath the supporting-plate 4 are mounted a number of incandescent electric-light bulbs 25 25, and these are supported by boards 26 and may be readily removed when desired. Reflectors 27 may be provided beneath the lights to more effectually light up the chart. Beneath the reflector is also provided a sheet of asbestos 28 to as much as possible avoid the bad effects of the heat emanating from the lights.

Beneath the supporting-plate 4 is provided an indicating-arm 29, having an upturned end portion 30, which comes into close proximity with the supporting-plate 4. This arm-indicator is provided at one end with the gear-like member 31. The shafts 32 and 33, which are mounted longitudinally of the table, are provided exteriorly thereof with the knobs 34 and 35 for the purpose of effecting the adjustment of the indicator. The block 36 is provided on the interior with the screw-threaded portion, which corresponds with the screw-threads of the shaft 32. The gear portion 31 of the indicator 29 is pivoted on the block 36. In this manner it will be seen that the indicator may be moved bodily in a longitudinal direction by the rotation of the shaft 32. The worm 37 is mounted on the shaft 33 and provided on its interior with a groove to coact with the spline or key of the shaft 33. This worm 37 engages the teeth of the gear 31. Rotation of the shaft 33 therefore causes the rotation of the worm 37 and the consequent swinging of the indicator 29 about its pivot. Two lugs 40 40 project from the block 36 and partially surround the splined shaft 33. When the shaft 32 is rotated and the block 36 moved longitudinally, the worm 37 may slide freely on its shaft 33. Rotation of the shaft 33 merely causes the swinging of the indicator-arm 29. It will thus be seen that by the suitable adjustment of the two shafts 32 and 33 the indicator 29 may be moved so that the point 30 will stand in any position desired beneath the chart. Its shadow will therefore be cast upon the chart and be visible from above.

Since the time of the reading of the chart is also important, we have provided the time-indicator wheels 41 and 42, the first of which carries a series of numbers indicating minutes and the latter figures indicating hours. These wheels are shown in Fig. 5. The rotation of the operating-knob 43, which controls the gear 44, will turn the time-wheels 41 and 42 together, so that the hour and minute may be indicated. For this purpose the ratio between the gears is such that the wheel 41 will turn once for every one-twelfth revolution of the wheel 42.

This chart-table is adapted to be used out of doors and in all kinds of weather, and the adjustments are such as to render it serviceable under all conditions.

If the adjustment of the springs 18 is properly effected with that end in view, sufficient yielding of the frame 5 may be provided so that when the chart is in place over the plate 4 the cover 2 of the box may be closed, and the chart will be pressed tightly and smoothly against the under side of the top plate 3. Of course to move the chart again after this it is necessary to either raise the cover or else operate the shaft 9.

What we claim is—

1. A chart-table, including a glass top, a glass support mounted beneath said top, an indicator beneath said support, and means for throwing light beneath said support and indicator whereby the shadow of the indicator may be seen from above said glass top.

2. A chart-table, including a glass top, a glass support mounted beneath said top, an indicator mounted adjustably beneath said support, and means for throwing light beneath said support and indicator whereby the shadow of the indicator may be seen from above said glass top.

3. A chart-table, including a glass top, a glass support mounted beneath said top, an indicator beneath said support, means for moving said indicator in two directions, and means for throwing light beneath said support and indicator whereby the shadow of the indicator may be seen from above said glass top.

4. A chart-table including a casing, a glass top therefor, a glass support mounted beneath said top for supporting a chart, an indicator mounted beneath the said support for marking the position of points on said chart, a time-indicator mounted within the said casing visible through said glass top, and means projecting outside the casing for operating said time-indicator.

5. A chart-table, including a casing, a glass top therefor, a glass support mounted beneath said top for supporting a chart, a position-indicator mounted beneath the said support for marking the position of points on said chart, a time-indicator mounted within the said casing visible through said glass top, and means projecting outside the casing for operating said time-indicator, and means projecting outside the casing for operating the position-indicator.

6. A chart-table, including a casing having a glass top, and glass support for a chart, and a shadow-indicator comprising a screw-shaft, a splined shaft, a block mounted on said screw-shaft, a worm-wheel carried by the splined shaft, a gear carried by the block engaging with said worm, and a pointer carried by said gear.

7. A chart-table, including a casing having a glass top, and glass support for a chart, and a shadow-indicator comprising a screw-shaft, a splined shaft, a block mounted on said screw-shaft, a worm-wheel carried by the splined shaft, a gear carried by the block engaging with said worm, and a pointer carried by said gear, and a time-indicator comprising an hour-wheel and a minute-wheel, a gear intermediate of said wheels for rotating the same, and a handle projecting outside the said casing for turning said gear.

8. A chart-table, including a casing having a glass top and support for a chart, a time-indicator comprising a rotatable hour-wheel, a rotatable minute-wheel and gear intermediate of the two, and handle projecting outside of the casing for operating the said wheels.

9. A chart-table including a glass top, a supporting-plate for a chart, supporting-posts, a pair of levers pivoted to said supporting-plate and to said supporting-posts, an operating-shaft, an eccentric mounted on said shaft and an eccentric-strap coacting with said eccentric and also directly engaging one end of each of said levers.

10. A chart-table including a glass top, a supporting-plate for a chart, yieldingly-mounted supporting-posts, a pair of levers pivoted to said supporting-plate and to said posts, an operating-shaft, an eccentric mounted on said shaft and an eccentric-strap coacting with said eccentric and also engaging one end of each of said levers.

11. A chart-table including a glass top, a supporting-plate for a chart, supporting-posts, adjustable spring-supports for said posts, a pair of levers pivoted to said supporting-plate and to said posts, an operating-shaft, an eccentric on said shaft and an eccentric-strap coacting with said eccentric and also engaging one end of each of said levers.

JAMES C. COLLAMORE.
GRANT W. KERST.

Witnesses:
ROBT. S. ALLYN,
L. VREELAND.